United States Patent
Meyer et al.

(10) Patent No.: US 10,996,330 B2
(45) Date of Patent: May 4, 2021

(54) ANTENNA DEVICE FOR A RADAR SENSOR

(71) Applicant: Robert Bosch GmbH, Stuttgart (DE)

(72) Inventors: Johannes Meyer, Ettlingen (DE); Klaus Baur, Mietingen (DE)

(73) Assignee: Robert Bosch GmbH, Stuttgart (DE)

( * ) Notice: Subject to any disclaimer, the term of this patent is extended or adjusted under 35 U.S.C. 154(b) by 388 days.

(21) Appl. No.: 16/083,728

(22) PCT Filed: Jan. 18, 2017

(86) PCT No.: PCT/EP2017/050983
§ 371 (c)(1),
(2) Date: Sep. 10, 2018

(87) PCT Pub. No.: WO2017/153073
PCT Pub. Date: Sep. 14, 2017

(65) Prior Publication Data
US 2019/0086535 A1 Mar. 21, 2019

(30) Foreign Application Priority Data

Mar. 11, 2016 (DE) .................. 10 2016 203 998.9

(51) Int. Cl.
*G01S 13/931* (2020.01)
*G01S 7/03* (2006.01)
(Continued)

(52) U.S. Cl.
CPC ............ *G01S 13/931* (2013.01); *G01S 7/032* (2013.01); *H01Q 1/3233* (2013.01);
(Continued)

(58) Field of Classification Search
CPC ................... G01S 13/931; G01S 7/032; G01S 2013/93271; G01S 2013/93272;
(Continued)

(56) References Cited

U.S. PATENT DOCUMENTS

| 3,987,455 A | 10/1976 | Olyphant, Jr. |
| 6,094,172 A | 7/2000 | Koscica et al. |

(Continued)

FOREIGN PATENT DOCUMENTS

| CN | 102385053 A | 3/2012 |
| CN | 103649773 A | 3/2014 |

(Continued)

OTHER PUBLICATIONS

M. Schneider et al., Planar 77 GHz Antennas on New Thermoplastic Polymer Substrate, Proceedings of Asia-Pacific Microwave Conference, p. 303-306, 2010 (Year: 2010).*

(Continued)

*Primary Examiner* — Bernarr E Gregory
*Assistant Examiner* — Fred H Mull
(74) *Attorney, Agent, or Firm* — Norton Rose Fulbright US LLP; Gerard Messina

(57) ABSTRACT

An antenna device for a radar sensor, including: at least one first antenna array that is situated on a surface of a substrate and that includes a defined number of planar antenna elements connected in series; at least one second antenna array that is situated on the surface of the substrate and that includes a defined number of planar antenna elements connected in series; a feed line that is connected at the center of each of the two antenna arrays; with the aid of the feed line a feed signal being feedable into the antenna array in such a way that a feed signal that is phase-shifted by 180 degrees with respect to the second antenna array is suppliable to the first antenna array.

8 Claims, 4 Drawing Sheets

(51) Int. Cl.
    *H01Q 1/32*     (2006.01)
    *H01Q 21/06*    (2006.01)
    *H01Q 21/00*    (2006.01)
    *H01Q 13/20*    (2006.01)
(52) U.S. Cl.
    CPC ....... *H01Q 13/206* (2013.01); *H01Q 21/0075* (2013.01); *H01Q 21/065* (2013.01); *G01S 2013/93271* (2020.01); *G01S 2013/93272* (2020.01); *G01S 2013/93274* (2020.01)
(58) Field of Classification Search
    CPC ........ G01S 2013/93274; H01Q 1/3233; H01Q 21/065; H01Q 13/206
    See application file for complete search history.

(56) References Cited

U.S. PATENT DOCUMENTS

| | | | |
|---|---|---|---|
| 7,868,828 | B2 | 1/2011 | Shi et al. |
| 2009/0021429 | A1 | 1/2009 | Colburn et al. |
| 2015/0029072 | A1 | 1/2015 | Huang et al. |
| 2015/0255867 | A1 | 9/2015 | Inoue et al. |
| 2016/0233589 | A1* | 8/2016 | Kim ................ H01Q 1/3233 |

FOREIGN PATENT DOCUMENTS

| | | |
|---|---|---|
| CN | 103682676 A | 3/2014 |
| EP | 2822095 A1 | 1/2015 |
| JP | H03297207 A | 12/1991 |
| WO | 2013055272 A1 | 4/2013 |

OTHER PUBLICATIONS

K.F. Lee et al. Microstrip Patch Antennas, Imperial College Press, p. 8-9, 2011 (Year: 2011).*

Center. (2016). The American Heritage Dictionary of the English Language (6th ed.). Houghton Mifflin. Credo Reference: https://search.credoreference.com/content/entry/hmdictenglang/center/0 (Year: 2016).*

Central. (2016). The American Heritage Dictionary of the English Language (6th ed.). Houghton Mifflin. Credo Reference: https://search.credoreference.com/content/entry/hmdictenglang/central/0 (Year: 2016).*

International Search Report for PCT/EP2017/050983, dated April 21, 2017.

* cited by examiner

ANTENNA DEVICE FOR A RADAR SENSOR

FIELD OF THE INVENTION

The present invention relates to an antenna device for a radar sensor. Moreover, the present invention relates to a method for manufacturing an antenna device for a radar sensor.

BACKGROUND INFORMATION

The prevalence of radar sensors in the automotive field has increased significantly in recent decades, and continues to grow. The aim of the first generations of sensors was to detect the surroundings of the vehicle only in an angular range ahead of the vehicle limited to distances of up to approximately 250 m. These sensors, referred to as front sensors, also represent an essential component of detecting the surroundings of automobiles in present and future radar systems. However, the requirements with regard to objects to be detected have increased considerably in recent years, and in view of emerging automated and autonomous driving, the requirements for surroundings detection continue to increase.

In addition to objects that are situated directly ahead of the vehicle, it is becoming increasingly important to also detect objects at much greater angular deviations. Thus, present and future vehicles must be able, for example, to detect crossing targets such as pedestrians, bicycles, motorcycles, etc. The aim is to provide this functionality using sensors installed in the front corners of the vehicle, referred to as "corner sensors." In addition, the number of sensors situated in the vehicle rear end will likewise increase. Covering a blind spot, detecting rapidly passing vehicles, and likewise detecting crossing objects while backing out of a parking space, among other things, are possible with the aid of these sensors. Based on the stated examples, it is clear that the trend is toward full coverage of the visual range of the truck or motor vehicle with the aid of radar.

SUMMARY OF THE INVENTION

Therefore, the object of the present invention is to provide an antenna for a radar sensor, the antenna being intended to be suitable in particular for use in corner sensors of a motor vehicle.

According to a first aspect, the object is achieved with an antenna device for a radar sensor that includes:
  at least one first antenna array that is situated on a surface of a substrate and that includes a defined number of planar antenna elements connected in series;
  at least one second antenna array that is situated on the surface of the substrate and that includes a defined number of planar antenna elements connected in series;
  a feed line that is connected at the center of each of the two antenna arrays;
with the aid of the feed line a feed signal being feedable into the antenna array in such a way that a feed signal that is phase-shifted by 180 degrees with respect to the second antenna array is suppliable to the first antenna array.

In this way, with the antenna device two centrally fed groups of patch elements are implemented which achieve two maxima that are situated symmetrically with respect to one another and whose main beam directions are inclined relative to one another by a defined angle. With the antenna device, a radar sensor may be implemented that is advantageously usable in corner areas of a motor vehicle, due to the fact that an emission characteristic or directional characteristic may be established with an appropriate arrangement of the radar sensor relative to the motor vehicle. Use of the radar sensor is thus possible for the front corners as well as for the rear corners of the motor vehicle.

According to a second aspect, the object is achieved with a method for manufacturing an antenna device for a radar sensor, including the steps:
  arranging a defined number of planar antenna elements of a first antenna array, connected in series, on a substrate;
  arranging a defined number of planar antenna elements of a second antenna array, connected in series, on the substrate; and
  arranging a feed line, which is connected at the center of each of the two antenna arrays, on the substrate, the feed line being configured in such a way that a feed signal that is phase-shifted by 180 degrees with respect to the second antenna array is suppliable to the first antenna array.

Advantageous refinements of the antenna device are the subject matter of the further descriptions herein.

One advantageous refinement of the antenna device is characterized in that the two antenna arrays, relative to the feed line, have a functionally point-symmetrical design with respect to one another. A technically simple implementation concept for the antenna device is provided in this way.

Another advantageous specific embodiment of the antenna device is characterized in that
  the first antenna array includes a first antenna semigroup and a second antenna semigroup;
  the second antenna array includes a first antenna semigroup and a second antenna semigroup;
  a phase shift element is situated in the second antenna semigroup of the first antenna array;
  a phase shift element is situated in the first antenna semigroup of the second antenna array; and
  with the aid of a connecting element in each case, the feed line is connected to a connecting point of the first and second antenna semigroups of the first antenna array, and is connected to a connecting point of the first and second antenna semigroups of the second antenna array.

A 180-degree phase shift of the feed signal in the two antenna arrays is thus achieved, a phase shift element advantageously not being necessary in the feed line. As a result, a space-saving, compact design of the antenna device, and thus of the overall radar sensor, is possible. Due to the central feeding of the antenna device, a "robust" zero point in the antenna diagram is achievable due to the fact that there are few radiation variations in the xz plane.

Another advantageous embodiment of the antenna device provides that the connecting elements of the feed line have an asymmetrical design with respect to the antenna arrays. An extent of formation of a zero point between the two maxima may be advantageously dimensioned in this way. Requirements for an emission characteristic may thus be advantageously achieved via the technical design.

Another advantageous specific embodiment of the antenna device is characterized in that the antenna device includes a defined number of further antenna arrays, in each case subgroups, which each include two further antenna arrays, being connected to at least one of the antenna arrays. In this way an antenna array is provided that has the defined radiation properties.

Another advantageous specific embodiment of the antenna device is characterized in that a number of further antenna arrays connected to the first antenna array are identical to a number of further antenna arrays connected to the second antenna array.

The present invention is described in greater detail below with further features and advantages, with reference to several figures. All described features, alone or in any arbitrary combination, constitute the subject matter of the present invention, regardless of their wording or illustration in the description or figures, respectively, and regardless of their recapitulation in the claims or their back-reference. The figures are not necessarily rendered true to scale, and similar or functionally equivalent elements have the same reference numerals.

Provided device features analogously result from corresponding provided method features, and vice versa. This means in particular that features, technical advantages, and statements concerning the antenna device analogously result from corresponding statements, features, and advantages concerning the method for manufacturing an antenna device, and vice versa.

DETAILED DESCRIPTION

Figure 1:
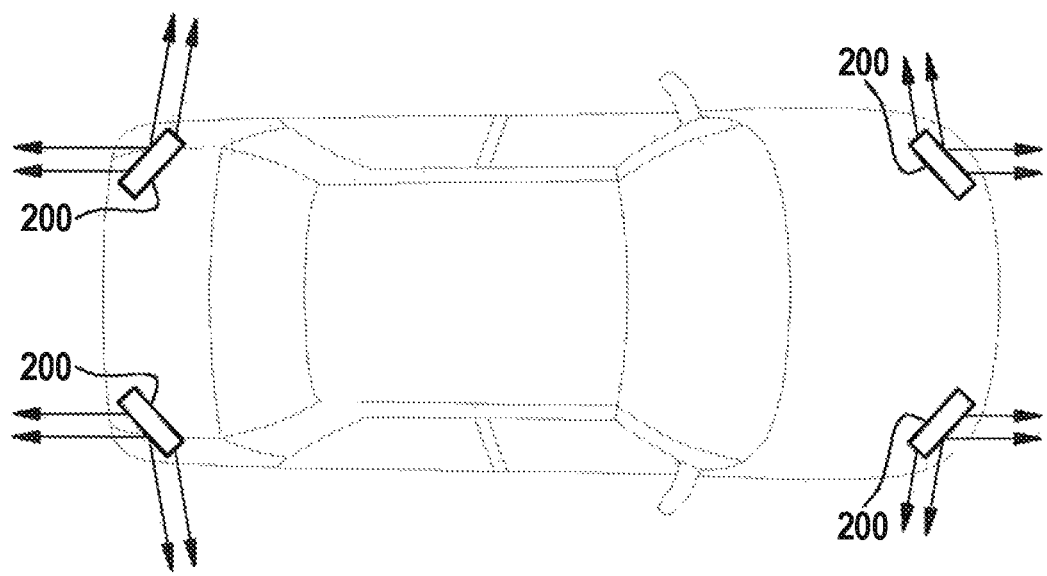
FIG. 1 shows installation positions of radar sensors in a motor vehicle.

FIG. 1 shows a top view onto a motor vehicle that includes multiple radar sensors 200, one radar sensor 200 being situated in each of the four corner areas of the motor vehicle. A front sensor which radiates and senses toward the front is not illustrated. Radar sensors 200 are provided for focusing a transmission power output/reception power output of transmitting antennas and receiving antennas, defined sensing ranges being achieved. Radar sensors 200 each have an antenna device (not illustrated), the antenna device in each case including a defined number of rectangular or square planar antenna elements ("patch elements") that are situated on a substrate and thus implement patch antennas, known per se.

Figure 2:
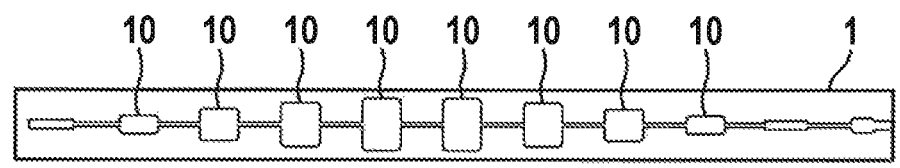
FIG. 2 shows a schematic illustration of a patch antenna array.

Such a known antenna array is schematically illustrated in a top view in FIG. 2. Planar antenna elements 10, with optimal control, achieve an emission maximum that is orthogonal to the substrate. Known automobile sensors are based on planar patch antenna arrays that are fed in series. One disadvantage of serial feeding is that the antenna diagram may change via material fluctuations, in particular permittivity fluctuations, and via a variation in the frequency range. This has the disadvantageous result that the antenna diagram "squints" in the elevation direction, and the maximum of the radiation characteristic thus no longer points in the desired direction, resulting in a loss in range. One possible remedial measure that results in increased stability of the directional diagram is a centrally fed antenna system, discussed in greater detail below.

The actual antenna arrays for the particular sensors (front, corner, rear) are derived starting from this basic element. The rear sensors and corner sensors are each installed in the corners of the vehicle, and in each case are intended to cover a symmetrical directional angular range of approximately 90°.

However, a power distribution is not uniform, and instead the emphasis is on focusing the radiation power in the outer corners. For this purpose, beam scanning of the particular transmitting antenna is provided in the antenna design. However, this has the disadvantage that the stability of the antenna diagram is limited by "squinting" antennas, and in particular the side lobe behavior as well as the emission direction change over the frequency range and material variations.

Figure 3:
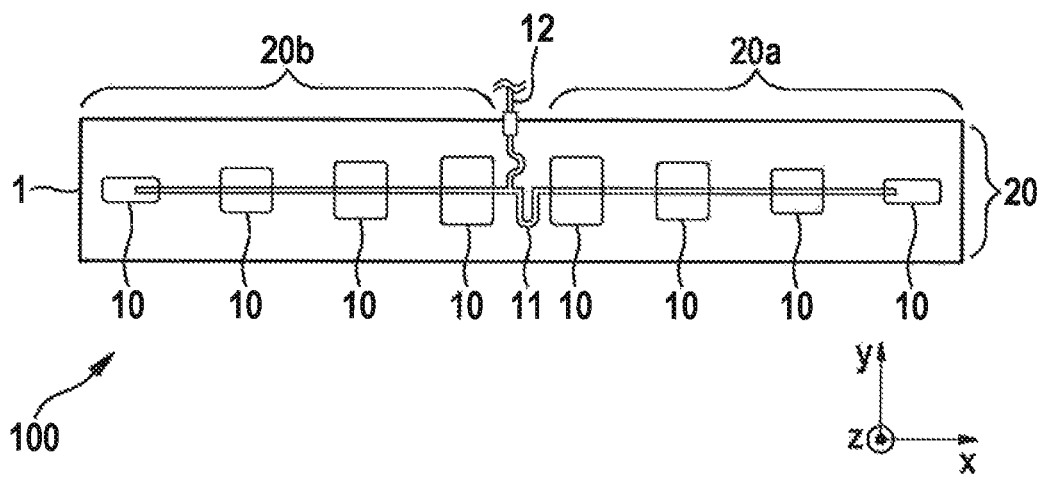
FIG. 3 shows a schematic illustration of central feeding of a patch antenna array.

FIG. 3 shows a known central feeding of such an antenna array 20 that includes two antenna semigroups 20a, 20b, the branch of first antenna semigroup 20a including a phase shift element or phase delay element 11. A path length for an electrical feed signal that is fed via feed line 12 is implemented with the aid of phase shift element 11, as the result of which a defined phase shift of the feed signal in the two antenna semigroups 20a, 20b is generated. As a result, a phase shift of 180° is thus generatable in first antenna semigroup 20a in comparison to second antenna semigroup 20b, which allows a radiation characteristic in the xz plane to be uniformly maintained, essentially unaffected by frequency fluctuations or material variations.

As a result of the described central antenna feeding, when there is a change in material properties, in particular in permittivity or a frequency shift, the two antenna semigroups 20a, 20b in the xz plane squint in opposite directions, as the result of which the squinting effects in total are once again compensated for. Increased stability of the antenna diagram thus advantageously results with the aid of phase shift element 11.

With the aid of the central feeding, a robust zero point in the antenna diagram is generatable which is essentially independent of material fluctuations of the antenna device, and of frequency fluctuations of the feed source. It is thus possible to generate robust antenna diagrams that are needed for the use of future rear sensors and corner sensors. Thus, for the design of such a centrally fed antenna, a 180° phase shift element is necessary in order to achieve a structural overlap of the two antenna semigroups 20a, 20b. Two antenna arrays are necessary for generating a zero point in the azimuth, i.e., essentially in parallel to a roadway surface, based on an application in the motor vehicle.

Feeding of the two antenna arrays must be shifted by 180° relative to one another. This may be advantageously achieved with an arrangement according to FIG. 4.

Figure 4:
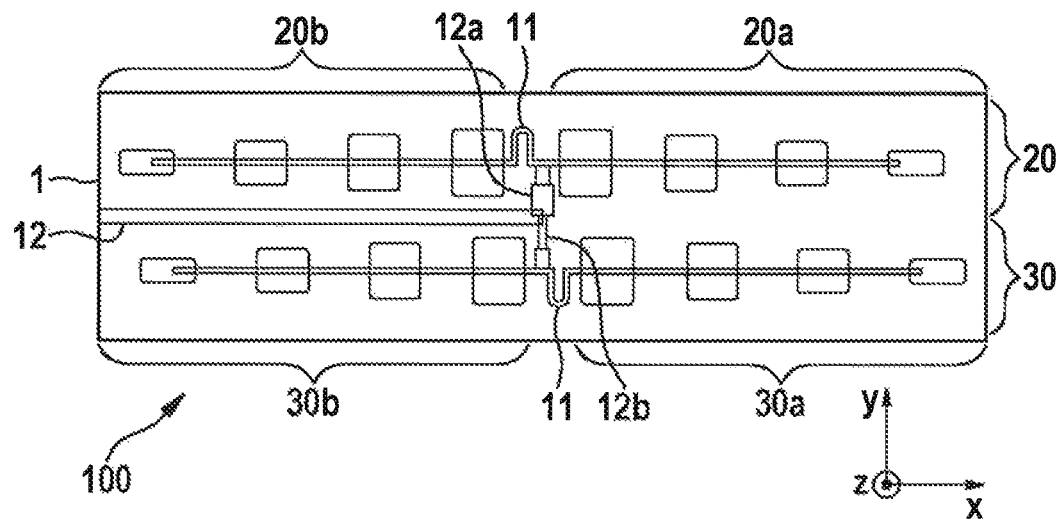
FIG. 4 shows one specific embodiment of an antenna device according to the present invention.

FIG. 4 shows a first specific embodiment of a provided antenna device 100 for a radar sensor. Antenna device 100 includes a first antenna array 20 and a second antenna array 30, which include two antenna semigroups 20a, 20b and 30a, 30b, respectively. The two antenna semigroups 20, 30 are fed or excited by central feeding with the aid of a feed line 12, feed line 12 having a T shape with two short connecting elements 12a, 12b to antenna arrays 20, 30. The arrangement thus has a functionally point-symmetrical design relative to an intersection point of T-shaped feed line 12.

This is achieved in that a phase shift element 11 is situated in each case in first antenna semigroup 20b and in second antenna semigroup 30a. Two symmetrical main maxima of a radiation characteristic relative to the yz plane may be generated with such a configuration. This means that a characteristic having two mutually inclined radiation maxima relative to the yz plane is formed. This is particularly advantageous for use in the so-called rear sensors and corner sensors of automotive radar sensors mentioned above, since in that case mutually pivoted emission maxima are very useful.

Alternatively, the functionality of phase shift elements 11 may also be achieved using geometric shapes different from those described. For example, it is conceivable for phase shift elements 11 to be oriented differently, to have a circular design, etc.

It is apparent that the short crossbars or connecting elements 12a, 12b of feed line 12 have an asymmetrical design, and thus in effect implement a power splitter. As a result, a nonuniform amount of electrical power may be fed into the two antenna arrays 20, 30. It is thus advantageously possible to form a minimum between the two stated main maxima that is stronger or weaker, the minimum being stronger the more symmetrical the two connecting elements 12a, 12b are formed. In this way, antenna device 100 generates a power reduction in the middle, and emits electromagnetic power at an offset angle in a defined manner, as the result of which use in the mentioned corner sensors of motor vehicles is very favorable. The described antenna concept is also well suited for a multiple input multiple output (MIMO) antenna array design.

With the described configuration, due to the compact and relatively low-loss feed network in the form of feed line 12 it is possible to achieve small space requirements for antenna device 100 in comparison to conventional approaches. This may be explained by the fact that a phase shift element that is necessary for generating a 180° phase shift is not situated in comparatively short connecting elements 12a, 12b of feed line 12, so that the two antenna arrays 20, 30 may be installed in parallel alignment with one another in a space-saving manner.

Figure 5:
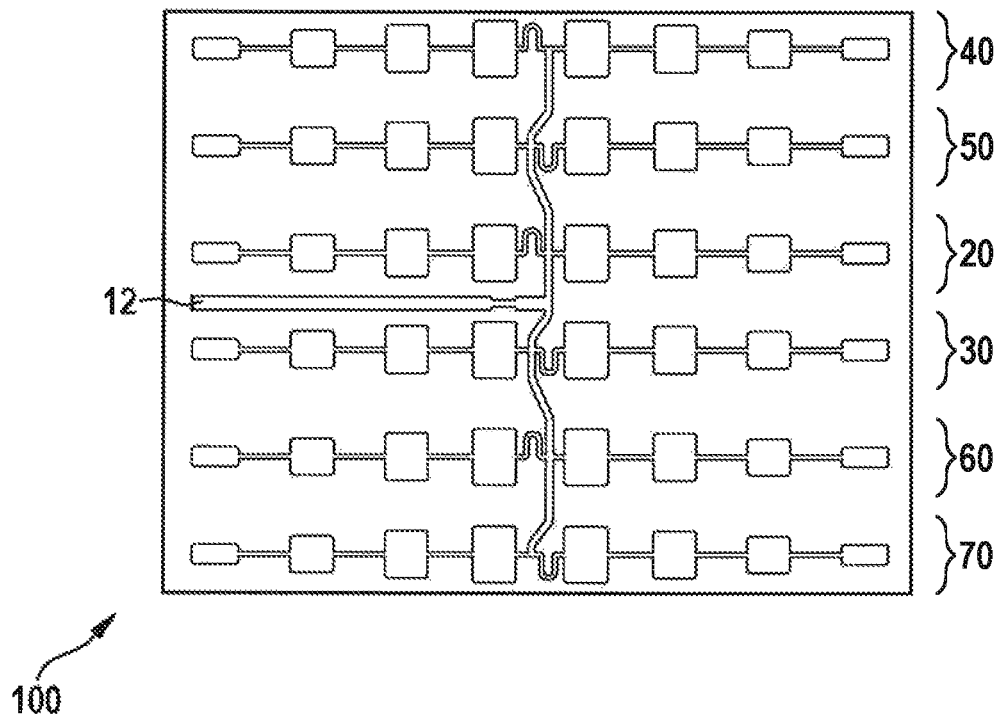
FIG. 5 shows an antenna array that is implemented using the provided antenna device.

FIG. 5 shows an advantageous use of described antenna device 100 for an antenna array. An antenna array with a total of six antenna arrays 20 . . . 70 is apparent, the two antenna arrays 20, 30 being centrally fed, and in each case further antenna arrays 40, 50 and 60, 70 being connected to the two mentioned antenna arrays 20, 30, above and below same. A defined emission characteristic of an antenna array may be achieved in this way.

Figure 6:
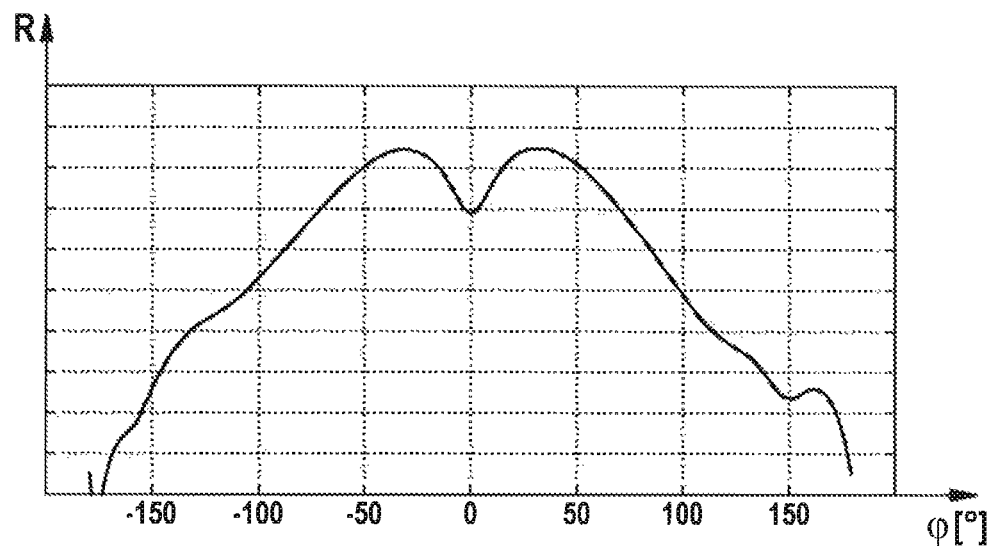
FIG. 6 shows a radiation characteristic of the provided antenna device.

FIG. 6 shows a radiation diagram of the specific embodiment in FIG. 4, where a curve of a dimensionless range R is plotted with respect to an azimuth angle φ expressed in degrees. It is apparent that a minimum of antenna device 100 occurs at approximately 0°. Two antenna maxima occur at azimuth angles of approximately +45° and approximately −45°, as the result of which an emission characteristic that is pivoted by approximately 90° is achieved, which makes use in the mentioned corner sensors of motor vehicles advantageous. A reduction in the average minimum may be achieved by the above-mentioned dimensioning of connecting elements 12a, 12b.

Figure 7:
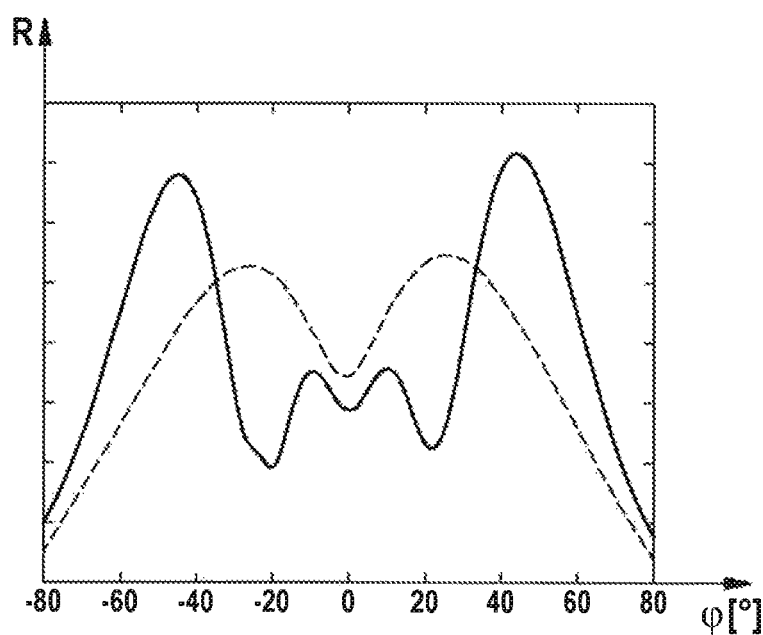
FIG. 7 shows radiation characteristics of the provided antenna device and of the antenna array.

FIG. 7 shows a similar pattern of the radiation characteristic from FIG. 6 in a dashed-line curve, and shows the pattern of a radiation characteristic of the antenna array from FIG. 5 in a solid-line curve. It is also apparent here that in each case two main maxima are formed at approximately +45° and approximately −45°, which roughly achieve an illumination of a radar sensor of approximately 90°.

Figure 8:
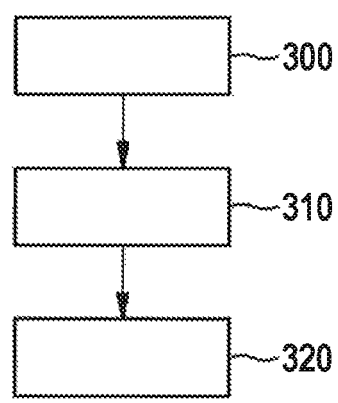
FIG. 8 shows a schematic flow chart of one specific embodiment of the method according to the present invention for manufacturing an antenna device.

FIG. 8 shows a schematic flow chart of one specific embodiment for manufacturing an antenna device 100.

A defined number of planar antenna elements 10, connected in series, of a first antenna array 20 are arranged on a substrate 1 in a step 300.

A defined number of planar antenna elements 10, connected in series, of a second antenna array 30 are arranged on a substrate 1 in a step 310.

A feed line 12 that is connected at the center of each of the two antenna arrays 20, 30 is arranged on substrate 1 in a step 320, antenna arrays 20, 30 and feed line 12 being configured in such a way that a feed signal that is phase-shifted by 180 degrees with respect to second antenna array 30 is suppliable to first antenna array 20.

In summary, the present invention provides an antenna device and a method for manufacturing an antenna device for a radar sensor, with which a robust radar sensor having defined radiation properties and to be used in particular in corner areas of the motor vehicle may be implemented.

Although the present invention has been described above with reference to specific exemplary embodiments, it is in no way limited thereto. Those skilled in the art will therefore proceed to also implement specific embodiments that are not described, or only partially described, herein without departing from the core of the present invention.

What is claimed is:

1. An antenna device for a radar sensor, comprising:
    at least one first antenna array situated on a surface of a substrate and that includes a defined number of planar antenna elements connected in series;
    at least one second antenna array situated on the surface of the substrate and that includes a defined number of planar antenna elements connected in series; and
    a feed line connected at a respective centrally located connecting point of each of the first and second antenna arrays;
    wherein, with the aid of the feed line, a feed signal is feedable into the first and second antenna arrays so that a feed signal that is phase-shifted by 180 degrees with respect to the second antenna array is suppliable to the first antenna array;
    wherein the first antenna array includes a first antenna semigroup and a second antenna semigroup, a first phase shift element is situated in the second antenna semigroup of the first antenna array and is configured to phase-shift the feed signal to the second antenna semigroup of the first antenna array by 180 degrees with respect to the feed signal to the first antenna semigroup of the first antenna array;
    wherein the second antenna array includes a first antenna semigroup and a second antenna semigroup, a second phase shift element is situated in the first antenna semigroup of the second antenna array and is configured to phase-shift the feed signal to the first antenna semigroup of the second antenna array by 180 degrees with respect to the feed signal to the second antenna semigroup of the second antenna array;
    wherein a first connecting element connects the feed line to a first connecting point of the first antenna array between the first antenna semigroup of the first antenna array and the second antenna semigroup of the first antenna array;
    wherein a second connecting element connects the feed line to a second connecting point of the second antenna array between the first antenna semigroup of the second antenna array and the second antenna semigroup of the second antenna array;

wherein the substrate has a first end and a second end opposite the first end;

wherein the first antenna semigroup of the first antenna array is closer to the first end than the second antenna semigroup of the first antenna array is to the first end; and wherein the first antenna semigroup of the second antenna array is closer to the first end than the second antenna semigroup of the second antenna array is to the first end.

2. The antenna device of claim 1, wherein the first and second antenna arrays, relative to the feed line, have a functionally point-symmetrical design with respect to one another.

3. The antenna device of claim 1, wherein the first connecting element and the second connecting element are asymmetrical relative to one another.

4. The antenna device of claim 1, further comprising:
two further antenna arrays are connected to at least one of the first and second antenna arrays.

5. The antenna device of claim 4, wherein a number of further antenna arrays connected to the first antenna array are identical to a number of further antenna arrays connected to the second antenna array.

6. A method for manufacturing an antenna device for a radar sensor, the method comprising:
arranging a defined number of planar antenna elements of a first antenna array, connected in series, on a substrate;
arranging a defined number of planar antenna elements of a second antenna array, connected in series, on the substrate; and
arranging a feed line, which is connected at a centrally located connecting point of each of the first and second antenna arrays, on the substrate, the first and second antenna arrays and the feed line being configured so that a feed signal that is phase-shifted by 180 degrees with respect to the second antenna array is suppliable to the first antenna array using the feed line;
wherein the first antenna array includes a first antenna semigroup and a second antenna semigroup, a first phase shift element is situated in the second antenna semigroup of the first antenna array and is configured to phase-shift the feed signal to the second antenna semigroup of the first antenna array by 180 degrees with respect to the feed signal to the first antenna semigroup of the first antenna array;
wherein the second antenna array includes a first antenna semigroup and a second antenna semigroup, a second phase shift element is situated in the first antenna semigroup of the second antenna array and is configured to phase-shift the feed signal to the first antenna semigroup of the second antenna array by 180 degrees with respect to the feed signal to the second antenna semigroup of the second antenna array;
wherein a first connecting element connects the feed line to a first connecting point of the first antenna array between the first antenna semigroup of the first antenna array and the second antenna semigroup of the first antenna array;
wherein a second connecting element connects the feed line to a second connecting point of the second antenna array between the first antenna semigroup of the second antenna array and the second antenna semigroup of the second antenna array;

wherein the substrate has a first end and a second end opposite the first end;

wherein the first antenna semigroup of the first antenna array is closer to the first end than the second antenna semigroup of the first antenna array is to the first end; and wherein the first antenna semigroup of the second antenna array is closer to the first end than the second antenna semigroup of the second antenna array is to the first end.

7. The method of claim 6, wherein the first and second antenna arrays, relative to the feed line, are functionally point-symmetrical with respect to one another.

8. A radar sensor, comprising:
an antenna device for the radar sensor, including:
at least one first antenna array situated on a surface of a substrate and that includes a defined number of planar antenna elements connected in series;
at least one second antenna array situated on the surface of the substrate and that includes a defined number of planar antenna elements connected in series; and
a feed line connected at a centrally located connecting point of each of the first and second antenna arrays;
wherein, with the aid of the feed line, a feed signal is feedable into the antenna array so that a feed signal that is phase-shifted by 180 degrees with respect to the second antenna array is suppliable to the first antenna array;
wherein the first antenna array includes a first antenna semigroup and a second antenna semigroup, a first phase shift element is situated in the second antenna semigroup of the first antenna array and is configured to phase-shift the feed signal to the second antenna semigroup of the first antenna array by 180 degrees with respect to the feed signal to the first antenna semigroup of the first antenna array;
wherein the second antenna array includes a first antenna semigroup and a second antenna semigroup, a second phase shift element is situated in the first antenna semigroup of the second antenna array and is configured to phase-shift the feed signal to the first antenna semigroup of the second antenna array by 180 degrees with respect to the feed signal to the second antenna semigroup of the second antenna array;
wherein a first connecting element connects the feed line to a first connecting point of the first antenna array between the first antenna semigroup of the first antenna array and the second antenna semigroup of the first antenna array;
wherein a second connecting element connects the feed line to a second connecting point of the second antenna array between the first antenna semigroup of the second antenna array and the second antenna semigroup of the second antenna array;
wherein the substrate has a first end and a second end opposite the first end;
wherein the first antenna semigroup of the first antenna array is closer to the first end than the second antenna semigroup of the first antenna array is to the first end; and
wherein the first antenna semigroup of the second antenna array is closer to the first end than the second antenna semigroup of the second antenna array is to the first end.

* * * * *